(12) United States Patent
Sasaki

(10) Patent No.: US 6,483,665 B1
(45) Date of Patent: Nov. 19, 2002

(54) THIN FILM MAGNETIC HEAD AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/455,319

(22) Filed: Dec. 6, 1999

(30) Foreign Application Priority Data

Dec. 8, 1998 (JP) ............................................. 10-348502

(51) Int. Cl.[7] .............................. G11B 5/31; G11B 5/39
(52) U.S. Cl. ...................................... 360/126; 29/603.14
(58) Field of Search ................................ 360/317, 126; 29/603.07, 603.13, 603.14, 603.15, 603.16, 603.18

(56) References Cited

U.S. PATENT DOCUMENTS

| | | | | |
|---|---|---|---|---|
| 5,259,583 A | * | 11/1993 | Meredith | 248/494 |
| 5,438,747 A | | 8/1995 | Krounbi et al. | |
| 5,668,689 A | * | 9/1997 | Schultz et al. | 360/113 |
| 6,018,862 A | * | 2/2000 | Stageberg et al. | 29/603.14 |
| 6,043,959 A | * | 3/2000 | Crue et al. | 360/113 |
| 6,118,629 A | * | 9/2000 | Huai et al. | 360/126 |
| 6,188,544 B1 | * | 2/2001 | Mino | 360/126 |
| 6,226,149 B1 | * | 5/2001 | Dill, Jr. et al. | 360/126 |

FOREIGN PATENT DOCUMENTS

| | | |
|---|---|---|
| JP | 60-10409 | 10/1985 |
| JP | 62-245509 | 10/1987 |
| JP | 5-120628 | 5/1993 |
| JP | 06-176318 | 6/1994 |
| JP | 7-262519 | 10/1995 |

* cited by examiner

Primary Examiner—William Klimowicz
(74) Attorney, Agent, or Firm—Oliff & Berridge, PLC

(57) ABSTRACT

A bottom pole is divided into a bottom pole tip and a bottom pole layer. The bottom pole tip is formed on a flat surface of the bottom pole layer, and insulating layers made of inorganic materials are buried in a concave part between the bottom pole tip and a bottom connecting portion. The throat height is determined by the end close to the bottom pole tip of the insulating layer. An top pole tip is formed to be longer than the bottom pole tip on a write gap layer and is extended to a position facing part of a thin film coil. Mgnetomotive force from the thin film coil is conducted to the top pole tip efficiently, and a write characteristic of a thin film magnetic head is improved.

9 Claims, 9 Drawing Sheets

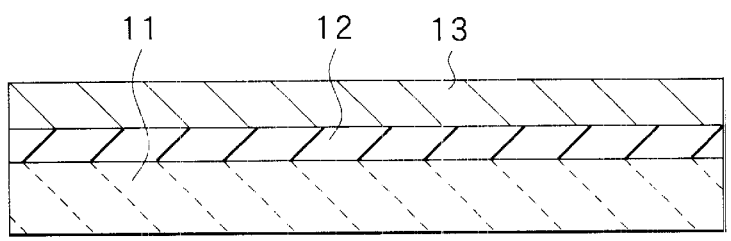
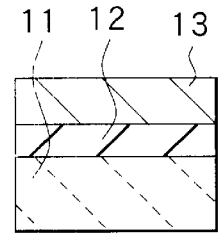
FIG.1A  FIG.1B
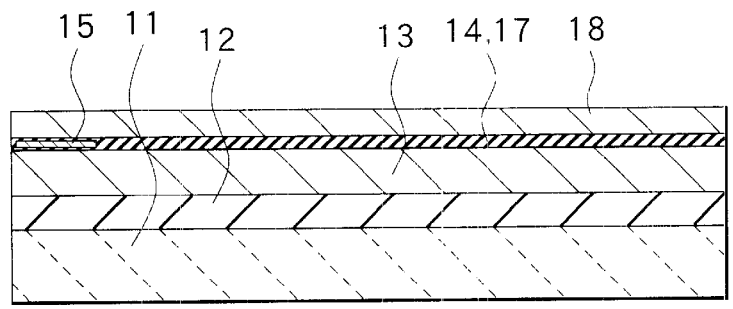
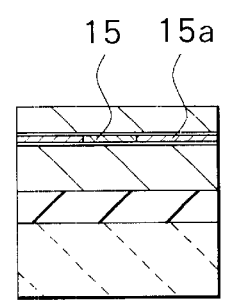
FIG.2A  FIG.2B
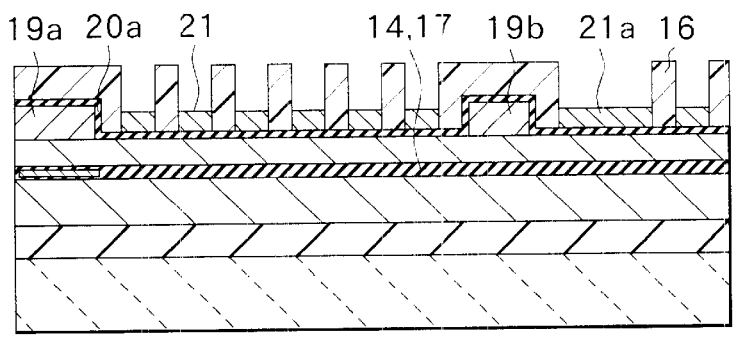
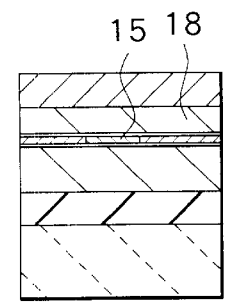
FIG.3A  FIG.3B

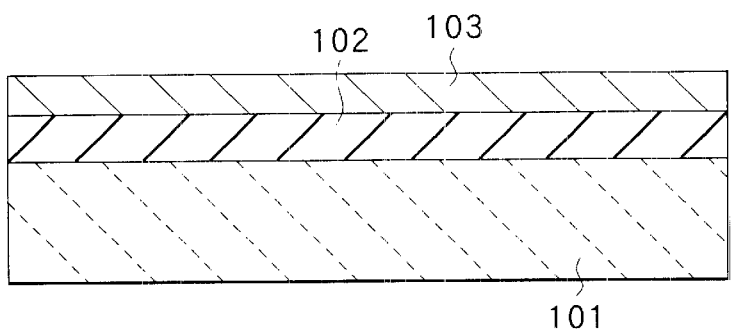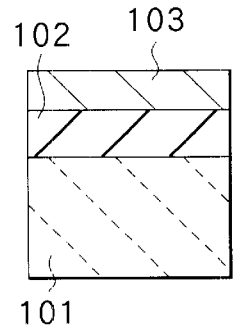
FIG.10A  FIG.10B
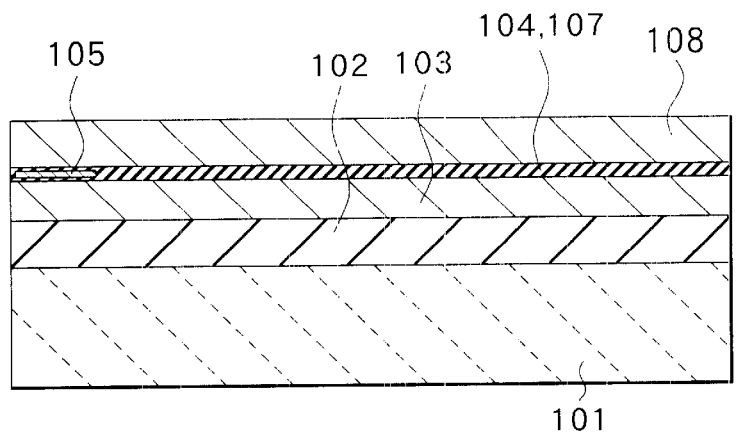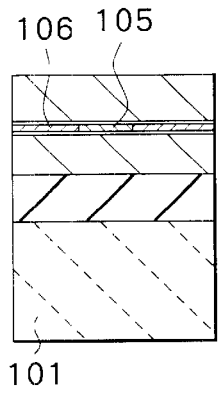
FIG.11A  FIG.11B
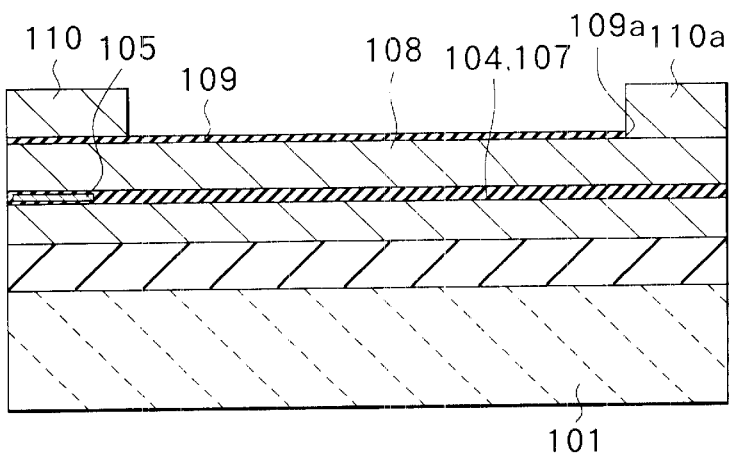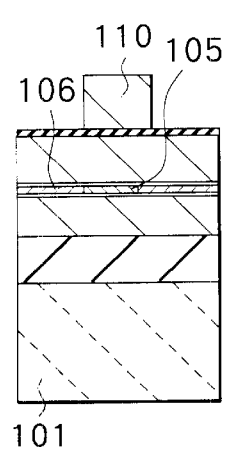
FIG.12A  FIG.12B

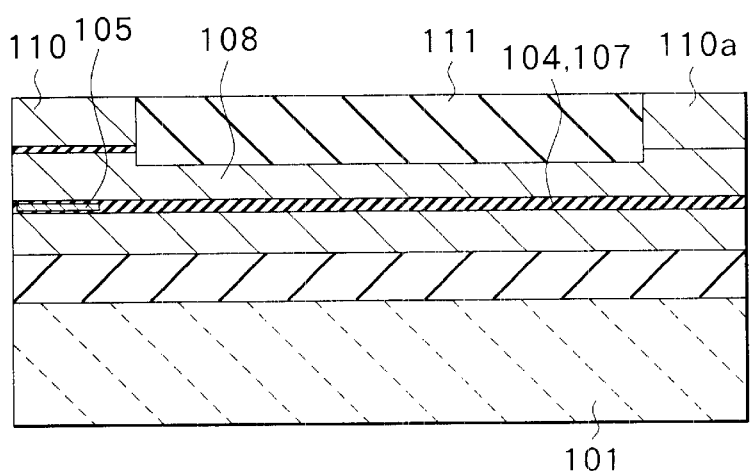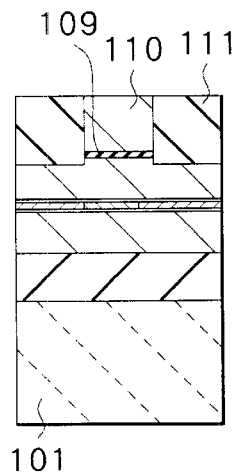
FIG.13A    FIG.13B
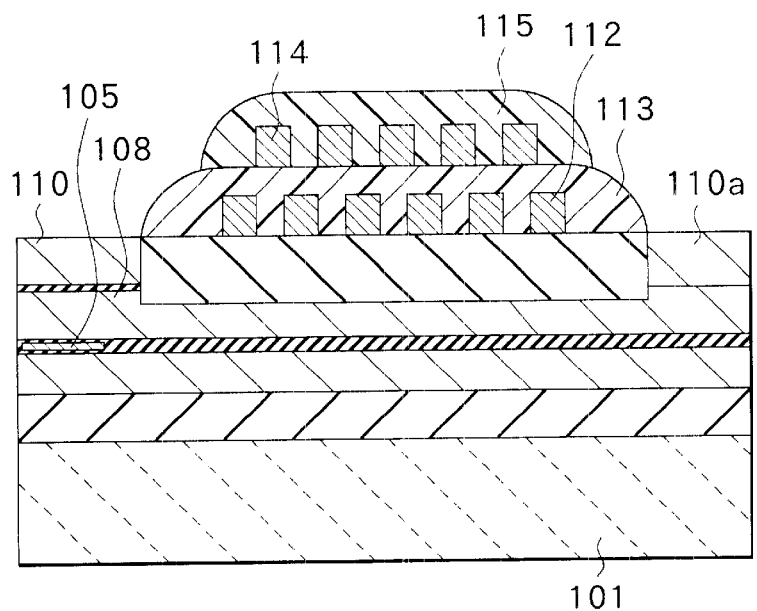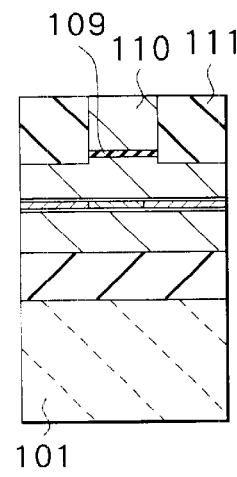
FIG.14A    FIG.14B ature is applied to planarize the photoresist film 113.

THIN FILM MAGNETIC HEAD AND METHOD OF MANUFACTURING SAME

BACKGROUND OF THE INVENTION

1. Field of the Invention

The present invention relates to a thin film magnetic head having at least an inductive-type magnetic transducer for writing and a method of manufacturing the same.

2. Description of the Related Art

In recent years, performance improvement in thin film magnetic heads has been sought in accordance with an increase in surface recording density of a hard disk drive. A composite thin film magnetic head, which is made of a layered structure having a recording head with an inductive-type magnetic transducer for writing and a reproducing head with a magneto resistive element (referred to as MR element in the followings) for reading-out has been widely used as a thin film magnetic head. As MR elements, there are an AMR element that utilizes the anisotropic magnetoresistive effect (referred to as AMR effect in the followings) and a GMR element that utilizes the giant magnetoresistive (referred to as GMR effect in the followings). A reproducing head using the AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

In general, an AMR film is made of a magnetic substance that exhibits the MR effect and has a single-layered structure. In contrast, many of the GMR films have a multi-layered structure consisting of a plurality of films. There are several types of producing mechanisms of the GMR effect. The layer structure of a GMR film depends on the mechanism. The GMR films include a super lattice GMR film, a spin valve film, a granular film and so on. The spin valve film is most efficient as the GMR film which has a relatively simple structure, exhibits a great change in resistance in a low magnetic field, and is suitable for mass reproducing.

As a primary factor for determining the performance of a reproducing head, there is a pattern width, especially an MR height. The MR height is the length (height) between the end of an MR element closer to an air bearing surface and the other end. The MR height is originally controlled by the amount of grinding when the air bearing surface is processed. The air bearing surface (ABS) is a surface of a thin film magnetic head facing a magnetic recording medium and is also called a track surface.

Performance improvement in a recording head has also been expected in accordance with the performance improvement in a reproducing head. It is necessary to increase the track density of a magnetic recording medium in order to increase the recording density among the performance of a recording head. In order to achieve this, it is necessary to develop a recording head with a narrow track structure, the width of a bottom pole and a top pole sandwiching a write gap on the air bearing surface being reduced to the order of some microns to submicron. Semiconductor process technique is used to achieve the narrow track structure.

Another factor determining the performance of a recording head is the throat height (TH). The throat height is the length (height) of a portion (magnetic pole portion) from the air bearing surface to an edge of an insulating layer which electrically isolates the thin film coil. Reducing the throat height is desired in order to improve the performance of a recording head. The throat height is also controlled by the amount of polishing when the air bearing surface is processed.

In order to improve the performance of a thin film magnetic head, it is important to form the recording head and the reproducing head in well balance.

Here, an example of a method of manufacturing a composite thin film magnetic head as an example of a thin film magnetic head of the related art will be described with reference to FIGS. 10A and 10B to FIGS. 15A and 15B.

As shown in FIGS. 10A and 10B, an insulating layer 102 made of, for example, alumina (aluminum oxide, $Al_2O_3$) is formed in a thickness of about 5 to 10 $\mu$m on a substrate 101 made of, for example, altic ($Al_2O_3 \cdot TiC$). Then, a bottom shield layer 103 for a reproducing head made of, for example, permalloy (NiFe) is formed on the insulating layer 102.

Next, as shown in FIGS. 11A and 11B, for example, alumina of about 100–200 nm in thickness is deposited on the bottom shield layer 103 to form a shield gap film 104. Then, an MR film 105 of tens of nanometers in thickness for making up the MR element for reproducing is formed on the shield gap film 104, and photolithography with high precision is applied to obtain a desired shape. Next, a lead terminal layer 106 for the MR film 105 is formed by lift-off method. Next, a shield gap film 107 is formed on the shield gap film 104, the MR film 105 and the lead terminal layer 106, and the MR film 105 and the lead terminal layer 106 are buried in the shield gap films 104 and 107. Then, a top shield-cum-bottom pole (called bottom pole in the followings) 108 of about 3 $\mu$m in thickness made of, for example, permalloy (NiFe), which is a material used for both the reproducing head and the recording head, is formed on the shield gap film 107.

Next, as shown in FIGS. 12A and 12B, a write gap layer 109 of about 200 nm in thickness made of an insulating layer such as an alumina film is formed on the bottom pole 108. Further, an opening 109a for connecting the top pole and the bottom pole is formed through patterning the write gap layer 109 by photolithography. Next, a pole tip 110 is formed of magnetic materials made of permalloy (NiFe) and nitride ferrous (FeN) through plating method, while a connecting portion pattern 110a for connecting the top pole to the bottom pole is formed. The bottom pole 108 and a top pole layer 116 which is to be described later are connected by the connecting portion pattern 110a and so that forming a through hole after CMP (Chemical and Mechanical Polishing) procedure, which is to be described later, becomes easier.

Next, as shown in FIGS. 13A and 13B, the write gap layer 109 and the bottom pole 108 are etched about 0.3–0.5 $\mu$m by ion milling having the pole tip 110 as a mask. By etching to the bottom pole 108, a trim structure is formed. As a result, widening of effective write track width can be avoided (that is, suppressing spread of magnetic flux in the bottom pole when data is being written.) Then, after an insulating layer 111 of about 3 $\mu$m, made of, for example, alumina is formed all over the surface, the whole surface is planarized by CMP.

Next, as shown in FIGS. 14A and 14B, a thin film coil 112 for an inductive-type recording head made of, for example, copper (Cu) is selectively formed on the insulating layer 111 by, for example, plating method. Further, a photoresist film 113 is formed in a desired pattern on the insulating layer 111 and the thin film coil 112 by photolithography with high precision. Then, a heat treatment of a predetermined temperature is applied to planarize the photoresist film 113 and to insulate between the turns of the thin film coils 112. Likewise, a thin film coil 114 and a photoresist film 115 are formed on the photoresist film 113, and a heat treatment of a predetermined temperature is applied to planarize the photoresist film 115 and to insulate between the turns of the thin film coils 114.

Next, as shown in FIGS. 15A and 15B, a top pole yoke-cum-top pole layer (called a top pole layer in the followings) 116 made of, for example, permalloy, which is a magnetic material for recording heads, is formed on the top pole 110, the photoresist films 113 and 115. The top pole layer 116 is in contact with the bottom pole 108 in a rearward position of the thin film coils 112 and 114, while being magnetically coupled to the bottom pole 108. Then, an overcoat layer 117 made of, for example, alumina is formed on the top pole layer 116. At last, a track surface (air bearing surface) 118 of the recording heads and the reproducing heads is formed through a slider machine processing, and a thin film magnetic head is completed.

In FIGS. 15A and 15B, TH represents the throat height and MR-H represents the MR height, respectively. P2W represents the track (magnetic pole) width.

As an factor for determining the performance of a thin film magnetic head, there is an apex angle as represented by θ in FIG. 15A besides the throat height TH and the MR height MR-H and so on. The apex angle is an angle between a line connecting the corner of a side surface of the track surface of the photoresist films 113 and 115, and an upper surface of the top pole layer 116.

To improve the performance of a thin film magnetic head, it is important to form the throat height TH, the MR height MR-H, the apex angle θ, and the track width P2W as shown in FIGS. 15A and 15B precisely.

Especially in recent years, to enable high surface density recording, that is, to form a recording head with a narrow track structure, submicron measurement of equal to or less than 1.0 μm is required for the track width PW2. Therefore, a technique of processing the top pole to submicron using a semiconductor processing technique is required. Also, using the magnetic materials having higher saturation magnetic flux density for the magnetic pole is desired in accordance with being a narrow track structure.

The problem is that it is difficult to minutely form the top pole layer 116 on a coil area (apex area) being protruded like a mountain covered with photoresist films (for example, the photoresist films 113, 115 shown in FIG. 15A.)

As a method of forming the top pole, the frame plating method, as disclosed in, for example, Japanese Patent Application laid-open in Hei 7-262519, is used. When the top pole is formed by the frame plating method, first, a thin electrode film made of, for example, permalloy is formed all over the apex area. Next, photoresist is applied on the apex area, and by patterning it through photolithography, a frame for plating is formed. Then, the top pole is formed through plating using the electrode film formed earlier as a seed layer.

There is, for example, equal to or more than 7 to 10 μm differences in height in the apex area. If the film thickness of the photoresist formed on the apex area is required to be equal to or more than 3 μm, a photoresist film of equal to or more than 8 to 10 μm in thickness is formed in the lower part of the apex area since the photoresist with liquidity gathers into a lower area. To form a narrow track as described, a pattern with submicron width is required to be formed with a photoresist film. Accordingly, it is necessary to form a micro pattern with submicron width with a photoresist film of equal to or more than 8 to 10 μm in thickness, however, it has been extremely difficult.

Moreover, during an exposure of photolithography, a light for the exposure reflects by an electrode film made of, for example, permalloy, and the photoresist is exposed also by the reflecting light causing deformation of the photoresist pattern. As a result, the top pole can not be formed in a desired shape because side walls of the top pole take a rounded shape and so on. As described, with a related art, it has been extremely difficult to precisely control the track P2W and to precisely form the top pole so as to have a narrow track structure.

For the reasons described above, as shown in the procedure of an example of the related art in FIGS. 12A and 12B–15A and 15B, a method of connecting the pole tip 110 and a yoke-cum-top pole layer 116 after forming a track width of equal to or less than 1.0 μm with the pole tip 110 which is effective for forming a narrow track of a recording head, that is, a method of dividing the regular top pole into the pole tip 110 for determining the track width and the top pole layer 116 which becomes the yoke area for inducing magnetic flux is employed (Ref. Japanese Patent Application laid-open Sho 62-245509, and Sho 60-10409). By dividing the top pole into two as described, the pole tip 110 can be minutely processed to submicron width on a flat surface of the write gap layer 109.

However, there have still existed problems as follows regarding the thin film magnetic head.

(1) First, in a magnetic head of the related art, the throat height is determined in the end of a further side from the track surface 118 of the pole tip 110. However, if the width of the pole tip 110 becomes narrower, the pattern edge is formed in a round shape by photolithography. Therefore, the throat height, which is required to have a highly precise measurement, is not formed to be uniform. As a result, the track width of the magnetoresistive element becomes unbalanced in a procedure of processing and polishing of the track surface. For example, if the track width with 0.5–0.6 μm is required, the end of a further side from the track surface 118 of the pole tip 110 shifts from the throat height zero position to the track surface side and writing gap is widely opened. As a result, the problem that writing of recording data cannot be performed has often occurred.

(2) As described above, in the magnetic head of the related art, it is not necessary to process the top pole layer 116 as minute as the pole tip 110, because the track width of the recording head is determined by the pole tip 110 which is one of the top pole being divided into two. However, since the position of the top pole layer 116 is determined in the upper area of the pole tip 110 by positioning of photolithography, if both of the top pole layer 116 and the pole tip 110 are largely shifted to one side when looking at the structure from the track surface 118 (FIG. 15A) side, so-called side write for performing writing on the top pole layer 116 side occurs. As a result, the effective track width becomes wider and writing is performed in a region other than the designated data recording region in a hard disk.

Further, if the track width of the recording head becomes extremely minute, especially equal to or less than 0.5 μm, the process precision of submicron width is required in the top pole layer 116. That is, if the measurement difference in the lateral direction of the pole tip 110 and the top pole layer 116 is too significant when looking at them from the track surface 118 (FIG. 15A) side, as described above, a side write occurs. As a result, writing is performed in a region other than the originally designated data recording region in a hard disk occurs.

Accordingly, not only the pole tip 110 but also the top pole layer 116 is required to be processed to the submicron width. However, it is difficult to perform fine-process of the top pole layer 116 since there is a significant difference in height as described above in the apex area under the top pole layer 116.

(3) In the magnetic head of the related art, there is a problem that it is difficult to shorten a yoke length. That is, the narrower the coil pitch becomes, the easier the achievement of a head with short yoke length becomes and, especially, a recording head with a high frequency characteristics can be formed. However, when the coil pitch is made indefinitely small, the distance from the throat height zero position to the outer periphery end of the coil becomes a main factor for preventing the yoke length from shortening. The yoke length can be made shorter with two-layered coil than one-layered coil so that many of the recording heads for high frequency employ the two-layered coil.

In the magnetic head of the related art, after forming a first layer of coil, a photoresist film of about 2 $\mu$m thick is formed in order to form an insulating film between the turns of the coils. Therefore, a small apex area having a rounded shape is formed in the outer peripheral end of the first layer of the coil. Next, a second layer of the coil is to be formed thereon. However, etching a seed layer for forming the second layer can not be performed in the slope of the apex area causing the coil to short-circuit, which makes it impossible to form the second layer of the coil. Accordingly, the second layer of the coil is required to be formed on a flat area. When the slope of the apex area is 45–55°, if the thickness of the coil is 2–3 $\mu$m and the thickness of the insulating film between the turns of the coil is 2 $\mu$m, the distance from the outer peripheral end of the coil to the vicinity of the throat height zero position is required to be 6–8 $\mu$m which is twice of 3–4 $\mu$m, (the distance from the contact area of the top pole and the bottom pole to the outer peripheral end of the coil is also required to be 4–5 $\mu$m). This has been the main factor for preventing the yoke length from shortening. For example, when forming two layers of coils with 11 turns with line/space being 1.5 $\mu$m/0.5 $\mu$m, suppose the first layer is 6 turns and the second layer is 5 turns, then the length of the coil of the yoke length is 11 $\mu$m. Therefore, since 6–8 $\mu$m is required in the apex area of the outer peripheral end, shortening of the yoke length is impossible. This has prevented the high frequency characteristics from improving.

Further, as the throat height of each thin film coil is close to the zero position, a magnetomotive force can be conducted more into the top pole and the thin film magnetic head with excellent recording characteristic can be achieved. Accordingly, the throat height of the thin film coil is desirably as close to the zero position as possible.

Related arts for shortening the yoke length include those disclosed in Japanese Patent Application laid-open Hei 6-176318 and Hei 5-120628. The Japanese Patent Application laid-open Hei 6-176318 discloses a technique in which a space width between the turns of the coils is reduced to form a multi-layer coil with high density and low resistance and, in order to shorten the yoke length, after forming the first coil, an insulating layer is formed between the turns of the first coils to form a thick second coil on the first coil by using the insulating layer as a mask. However, in this technique, it is not possible to form a thin film coil in the vicinity of the throat height zero position and to conduct a magnetomotive force from a thin film coil to a pole efficiently. Further, the problems described above, including precision control of the throat height at the recording head, can not be solved. On the other hand, in the Japanese Patent Application laid-open Hei 5-120628, in the area where a conductive coil is formed, a first metal layer compositing a gap layer is placed at the bottom side of the conductive coil, and an insulating layer and a second metal layer are placed at the upper side of the conductive coil in order to shorten the yoke length. However, in this technique, it is not possible to conduct the magnetomotive force from a thin film coil to a pole efficiently, and the problems described above, including precision control of the throat height, can not be solved.

The invention is presented to solve these problems. The first object is to provide a thin film magnetic head in which a magnetomotive force from the thin film coil can be conducted to a pole efficiently and improve a recording characteristic in the recording head, and a method of manufacturing the same.

The second object is to provide a thin film magnetic head which can precisely control a throat height in the recording head and in which a yoke length is shortened so that a magnetomotive force from the thin film coil can be conducted to a pole efficiently to improve the high frequency characteristic and the recording surface density, and a method of manufacturing the same.

The third object is, in addition to the effects described above, to provide a thin film magnetic head in which the submicron width of the top pole layer can be minutely processed and, further, whose characteristic of the recording head can be improved, and a method of manufacturing the same.

SUMMARY OF THE INVENTION

A thin film magnetic head having at least two magnetic layers includes a first magnetic pole and a second magnetic pole being magnetically coupled to each other, part of sides of which facing a recording medium face each other sandwiching a write gap layer, and one or more than two layers of thin film coil for generating magnetic flux, and part of the thin film coil faces one magnetic pole of the facing first magnetic pole and the second magnetic pole through an insulating layer.

In the thin film magnetic head of the invention, as part of the thin film coil faces either of two facing poles through an insulating layer, a magnetomotive force from the thin film coil can be conducted to a facing pole efficiently.

Further, the other thin film magnetic head of the invention has at least two magnetic layers including a first magnetic pole and a second magnetic pole being magnetically coupled to each other, part of sides of which facing a recording medium face each other sandwiching a write gap layer, and one or more than two layers of thin film coil for generating magnetic flux, and comprises a first magnetic layer; a first magnetic pole formed being divided from the first magnetic layer, a surface of which being the opposite of a adjacent surface of the write gap layer is magnetically coupled to part of a region of the first magnetic layer; an insulating layer formed of an inorganic material, and formed extendedly, at least from a surface of the first magnetic pole which is the opposite of a side facing the recording medium to one of the surfaces of the first magnetic layer; a thin film coil buried in a region in which the insulating layer is formed; a second magnetic pole facing the first magnetic pole sandwiching the write gap layer, as well as being formed longer than the first magnetic pole from a surface facing the recording medium to the inner direction and facing at least a part of the thin film coil; and a second magnetic layer formed by being divided from the second magnetic pole and magnetically coupled to the second magnetic pole in, at least, part of a surface of the second magnetic pole which is the opposite of a adjacent surface of the write gap layer.

A method of manufacturing a thin film magnetic head of the invention having at least two magnetic layers including a first magnetic pole and a second magnetic pole being magnetically coupled to each other, part of side of which facing a recording medium face each other sandwiching a write gap layer, and one or more than two layers of thin film coil for generating magnetic flux includes the steps of: forming a first magnetic pole on the first magnetic layer so as to be magnetically coupled to part of a region of the first magnetic layer after forming the first magnetic layer; forming insulating layers of inorganic materials extendedly, at least from a surface of the first magnetic pole which is the opposite side of a surface facing the recording medium to one of the surfaces of the first magnetic layer; forming a thin film coil within a concave region in which the insulating layers are formed; forming the second magnetic pole to be longer than the first magnetic pole so as to face at least a part of the thin film coil to the inner direction from a surface facing the recording medium at least after forming a write gap layer on the first magnetic pole; and forming the second magnetic layer by magnetically coupling to the second magnetic pole.

In another thin film magnetic head and a method of manufacturing the same of the invention, a first magnetic pole is formed being protruded shape on a first magnetic layer and a thin film coil is formed in a concave region adjacent to the first magnetic pole. Accordingly, an insulating layer made of an inorganic material can be buried within the concave area adjacent to the first magnetic pole whereby the throat height is determined precisely by the end of the opposite side of the track surface of the first magnetic pole.

Further, by burying the thin film coil within the concave region adjacent to the first magnetic pole, the difference in height in the apex area can be decreased compared to that of the related art. As a result, in the following process, when forming a second magnetic layer by photolithography, the difference in thickness of the photoresist film on the top and the bottom of the apex area is reduced. Accordingly, the second magnetic layer of the submicron measurement can be formed.

In addition, in the other thin film magnetic head of the invention, a thin film coil is not necessary to be formed away from the throat height zero position. As a result, the thin film coil can be formed in the vicinity of the throat height zero position of the end of the first magnetic pole. Also, since a second magnetic pole faces to a part of the first magnetic pole and the thin film coil sandwiching the write gap layer, the magnetomotive force from the thin film coil can be conducted to the second magnetic pole efficiently.

A thin film magnetic head and a method of manufacturing the same of the invention can be further achieved with the embodiment in the followings in addition to the configuration described above.

First, in a thin film magnetic head and a method of manufacturing the same according to the invention, the length from a surface of the first magnetic pole facing the recording medium may be formed to be equal to the throat height of the recording head. That is, in the thin film magnetic head and the method of manufacturing the same according to the invention, as the first magnetic pole is divided from the first magnetic layer and formed to be protruded shape against the first magnetic layer, an insulating layer made of an inorganic material is formed adjacent to the first magnetic pole. As a result, the throat height can be determined precisely by making the length of the first magnetic pole from the surface facing the recording medium to the inner direction equal to the length of the throat height of the recording head.

Further, in a thin film magnetic head and a method of manufacturing the same according to the invention, a first insulating layer may be formed extendedly from a surface of the first magnetic pole which is opposite to a surface facing the recording medium to one surface of the first magnetic layer to form a second insulating layer, at least, in between windings of the thin film coil.

Further, in a thin film magnetic head and a method of manufacturing the same according to the invention, a surface of the second insulating layer which is the opposite of a adjacent surface of the first magnetic layer may be planarized so as to make it substantially the same surface as the surface of the first magnetic pole which is the opposite of a adjacent surface of the write gap layer.

Further, in a thin film magnetic head and a method of manufacturing the same according to the invention, the width along a surface facing the recording medium of the first magnetic pole may be formed to be wider than the width of the second magnetic pole.

Further, in a thin film magnetic head and a method of manufacturing the same according to the invention, the end of the surface of the second magnetic layer facing the recording medium may be formed in a rearward position of the surface facing the recording medium.

Also, in a thin film magnetic head and a method of manufacturing the same according to the invention, further, a third insulating layer may be formed, at least, extendedly from a surface of the second magnetic pole which is the opposite side of a surface facing the recording medium to a surface of the write gap layer which is the opposite side of the surface adjacent to the second magnetic pole.

Moreover, in a thin film magnetic head and a method of manufacturing the same according to the invention, another thin film coil may be located within a region where the third insulating layer is formed and the another thin film coil may be placed between the third insulating layer and the second magnetic layer to be covered with other insulating layer which is different from the first through the third insulating layer.

Also, in a thin film magnetic head and a method of manufacturing the same according to the invention, the surfaces of the third insulating layer and the other insulating layer may be planarized to be substantially the same surface as a surface of the second magnetic pole which is the opposite side of a surface adjacent to the write gap layer.

Other and further objects, features and advantages of the invention will appear more fully from the following description.

BRIEF DESCRIPTION OF THE DRAWINGS

FIGS. 1A and 1B are cross section for describing a process of manufacturing a thin film magnetic head according to a first embodiment of the invention.

FIGS. 2A and 2B are cross sections for describing the following step shown in FIGS. 1A and 1B.

FIGS. 3A and 3B are cross sections for describing the following step shown in FIGS. 2A and 2B FIGS. 4A and 4B are cross sections for describing the following step shown in FIGS. 3A and 3B FIGS. 5A and 5B are cross sections for describing the following step shown in FIGS. 4A and 4B.

FIGS. 10A and 10B are cross sections for describing the process of manufacturing a thin film magnetic head of the related art.

FIGS. 11A and 11B are cross sections for describing the following step shown in FIGS. 10A and 10B.

FIGS. 12A and 12B are cross sections for describing following step shown in FIGS. 11A and 11B.

FIGS. 13A and 13B are cross sections for describing the following step shown in FIGS. 12A and 12B.

FIGS. 14A and 14B are cross sections for describing the following step shown in FIGS. 13A and 13B.

DETAILED DESCRIPTION OF THE PREFERRED EMBODIMENTS

Figure 4A:
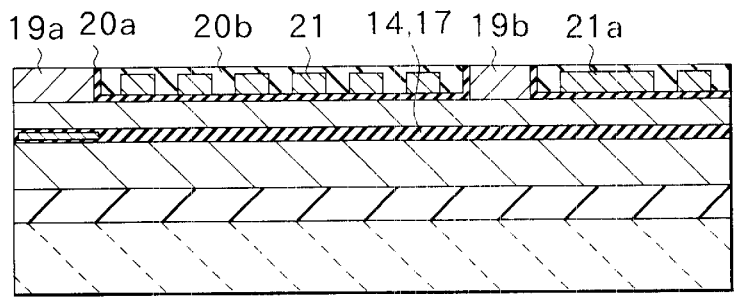

Embodiments of the invention will be described in detail with reference to the drawings in the followings.

[First Embodiment]

FIGS. 1A and 1B to FIGS. 6A and 6B illustrate a manufacturing process of a composite thin film magnetic head as a thin film magnetic head according to the first embodiment of the invention, respectively. FIGS. 1A–6A show the cross sections vertical to the track surface (ABS), and FIGS. 1B–6B show the cross sections parallel to the track surface of the magnetic pole portion.

First, the configuration of a composite thin film magnetic head according to the embodiment of the invention will be described with reference to FIGS. 6A and 6B. The magnetic head comprises a magnetoresistive reading-out head (called reproducing head in the followings) 1A for reproducing and an inductive recording head (called recording head in the followings) 1B for recording.

The reproducing head 1A is a pattern of magnetoresistive film (called MR film in the followings) 15 being formed on a substrate 11 made of, for example, altic ($Al_2O_3 \cdot TiC$) through an insulating layer 12 formed of, for example, alumina (aluminum oxide, $Al_2O_3$), a bottom shield layer 13 formed of, for example, ferrous aluminum silicide (FeAlSi), and a shield gap layer 14 formed of, for example, alumina in order. Also, a lead terminal layer 15a made of material such as tantalun (Ta), or tangsten (W) or the like which does not diffuse onto the MR films is formed on the shield gap layer 14, and the lead terminal layer 15a is electrically connected to the MR film 15. The MR film 15 is formed of several types of materials having magnetoresistive effect, such as permally (NiFe alloy), nickel (Ni)-Cobalt (Co) alloy and so on. A shield gap layer 17 made of, for example, alumina is stacked on the MR film 15 and the lead terminal layer 15a. In other words, the MR film 15 and the lead terminal layer 15a are buried between the shield gap layers 14 and 17. Further, it is not specifically limited to the MR film 15 but also other magnetoresistive film such as an AMR film, a GMR film or the like can be used.

The recording head 1B is formed a top pole on the reproducing head 1A through the top shield layer-cum-bottom pole for the MR film 15 and a write gap layer 22.

In the embodiment, the bottom pole is formed being divided into a bottom pole layer (bottom pole) 18 formed on the shield gap layer 17, and a bottom pole tip 19a formed on the bottom pole layer 18 on the track surface side. Likewise, the top pole is divided into two: one is a top pole tip 23a formed, sandwiching a write gap layer 22, on the bottom pole tip 19a on the track surface side, and the other is a yoke-cum-top pole layer (top pole) 25 which has a contact with the top pole tip 23a, and is formed along the top surface of the apex including the coil which is to be described later. The top pole layer 25 is magnetically coupled to the bottom pole layer 18 through a top connecting portion 23b and a bottom connecting portion 19b in the position which is the opposite (right-hand side in FIG. 6A) of the track surface of the apex area.

The bottom pole layer 18, the bottom pole tip 19a, the bottom connecting portion 19b, the top pole tip 23a, the top connecting portion 23b and the top pole layer 25 are formed of, for example, high saturated flux density material (Hi-Bs material), for example, NiFe (Ni: 50% by weight, Fe: 50% by weight), NiFe (Ni: 80% by weight, Fe: 20% by weight), FeN, FeZrNP, CoFeN and so on, respectively.

In the recording head 1B, the bottom pole tip 19a facing the top pole tip 23a has a trim structure in which part of the surface is processed to be protruded shape. As a result, widening of the effective write track width, that is, when writing data, spreading of the magnetic flux in the bottom pole can be suppressed.

In the embodiment, the bottom pole layer 18 corresponds to the first magnetic layer of the invention, and the bottom pole tip 19a corresponds to the first magnetic pole of the invention. Further, the top pole tip 23a corresponds to the second magnetic pole of the invention, and the top pole layer 25 corresponds to the second magnetic layer of the invention.

In the embodiment, a thin film coil 21 of the first layer is formed in a concave region adjacent to the bottom pole tip 19a and the bottom connecting portion 19b on the bottom pole layer 18. That is, an insulating layer 20a is formed in inner wall surface (bottom and side-wall surface) of the concave region, and the thin film coil 21 is formed on the insulating layer 20a. The space between the turns of the thin film coil 21 is buried with an insulating layer 20b, and the surface of the insulating layer 20b and the bottom pole tip 19a are planarized so that both surfaces form the same surface. As a result, the difference in height of the apex area including a thin film coil 24 to be described later is decreased for the height of the thin film coil 21. The insulating layer 20a corresponds to the first insulating layer of the invention, and the insulating layer 20b corresponds to the second insulating layer of the invention.

A write gap layer 22 is extended on the planarized insulating layer 20b and the thin film coil 21. In the embodiment, the top pole tip 23a is formed to be longer than the bottom pole tip 19a on the write gap layer 22 and is extended to a position which is facing a part of the thin film coil 21. An insulating layer 20c is formed in the concave region adjacent to the top pole tip 23a and the top connecting portion 23b. A thin film coil 24 of the second layer is formed on the insulating layer 20c. The thin film coil 24 is buried within an insulating layer 20d made of, for example, alumina. The thin film coils 21 and 24 are electrically connected to each other through the coil connecting portions 21a and 24a in a rearward position of the top connecting portion 23b and the bottom connecting portion 19b. The insulating layer 20c corresponds to the third insulating layer of the invention and the insulating layer 20d corresponds to the another insulating layer of the invention.

A yoke-cum-top pole layer 25 is formed on the insulating layer 20d. The top pole layer 25 is covered with an over coat layer 26.

In a magnetic head according to the embodiment, information is read out from a magnetic disk, (not shown in figure) by using magnetoresistive effect of the MR film 15 in the reproducing head 1A, while information is written to the magnetic disk by using a change of magnetic flux between the top pole tip 23a and the bottom pole tip 19a by the thin film coils 21 and 24 in the recording head 1B.

Next, a method of manufacturing a composite thin film magnetic head will be described.

In embodiment, first, as shown in FIGS. 1A and 1B, an insulating layer 12, made of, for example, alumina ($Al_2O_3$) is formed about 3–5 μm in thickness on a substrate 11 made of, for example, altic ($Al_2O_3 \cdot TiC$) by, for example, sputtering. Next, a bottom shield layer 13 for a reproducing head is formed by selectively forming permalloy (NiFe) of about 3 μm in thickness on the insulating layer 12 by plating method using a photoresist film as a mask. Then, an alumina film (not shown in figure) of about 4–6 μm in thickness is formed by, for example, sputtering or CVD (Chemical Vapor Deposition) and is planarized by CMP.

Next, as shown in FIGS. 2A and 2B, a shield gap layer 14 is formed by depositing, for example, alumina of about 100–200 nm in thickness on the bottom shield layer 13 by sputtering. Then, the MR film 15 for forming such as an MR element for reproducing is formed in tens of nanometers in thickness on the shield gap layer 14, and a desired shape is obtained by photolithography with high precision. Then, a lead terminal layer 15a for the MR film 15 is formed by the lift-off method. Next, a shield gap layer 17 is formed on the shield gap layer 14, the MR film 15 and the lead terminal layer 15a, and the MR film 15 and the lead terminal layer 15a are buried in the shield gap layers 14 and 17.

Then, a top shield-cum-bottom pole layer (bottom pole) 18, made of, for example, permalloy (NiFe) is formed about 1.0–1.5 μm in thickness on the shield gap layer 17.

Next, as shown in FIGS. 3A and 3B, the bottom pole tip 19a and the bottom connecting portion 19b are formed about 2.0–2.5 μm in thickness on the bottom pole layer 18. At this time, the top of the bottom pole tip 19a on the track side is formed to be in the position in the vicinity of the MR (GMR) height zero position, and the opposite side of the track surface of the bottom pole tip 19a is in the throat height zero position. The bottom pole tip 19a and the bottom connecting portion 19b may be formed of plating films such as NiFe as described, and may also be formed of sputter films such as FeN, FeZrNP, CoFeN, or the like.

Then, an insulating layer 20a of about 0.3–0.6 μm in film-thickness, made of an insulating material such as alumina is formed all over the surface by, for example, sputtering or CVD. Then, by using the pattern of the photoresist film 16 as a mask, the thin film coil 21 and a coil connecting portion 21a for an inductive type recording head made of, for example, copper (Cu) are formed in, for example, 1.0–2.0 μm in thickness and 1.2–2.0 μm in coil pitch by, for example, electroplating in the concave region which is formed of the bottom pole tip 19a and the bottom connecting portion 19b.

Figure 4B:
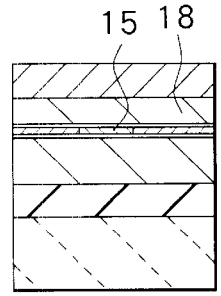

Next, as shown in FIGS. 4A and 4B, after removing the photoresist film 16, the insulating layer 20b of about 3.0–4.0 μm in thickness, made of an insulating material such as alumina is formed all over the surface by sputtering. Then, the surface is planarized by, for example, CMP so as to make the surface of the bottom pole tip 19a be exposed. At this time, in the embodiment, the surface of the thin film coil 21 is not exposed, but it may be exposed.

Figure 5A:
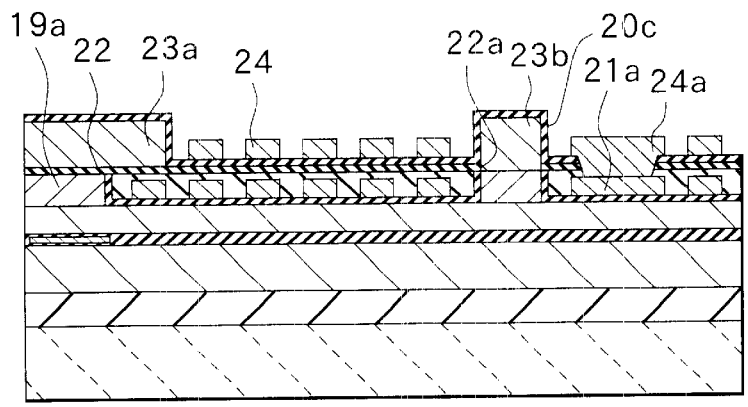
Figure 5B:
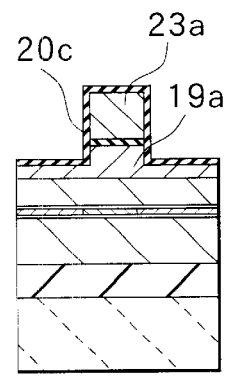

Next, as shown in FIGS. 5A and 5B, the write gap layer 22 of 0.2–0.3 μm in thickness made of an insulating material such as alumina is formed by sputtering. The write gap layer 22 may be formed of materials such as aluminum nitride (AlN), silicon oxide, silicon nitride and so on, besides alumina. Then, an opening 22a for connecting the top pole and the bottom pole is formed by patterning the write gap layer 22 by photolithography.

Further, the top pole tip 23a for determining the track width of a recording head is formed on the write gap layer 22 by photolithography. That is, a magnetic layer of about 2.0–3.0 μm in thickness, made of high saturated flux density material (Hi-Bs materials), for example, NiFe (Ni: 50% by weight, Fe: 50% by weight), Nife (Ni: 80% by weight, Fe: 20% by weight), FeN, FeZrNP, CoFeN and so on is formed on the write gap layer 22 by, for example, sputtering. Then, the top pole tip 23a is formed by selectively removing the magnetic layer by, for example, ion milling with, for example, Ar (argon) using a photoresist mask, while a top connecting portion 23b for magnetically connecting the top pole and the bottom pole is formed. The top pole tip 23a and the top connecting portion 23b may be etched by using a mask made of an inorganic insulating layer such as alumina, instead of using the photoresist mask. Further, the top pole tip 23a and the top connecting portion 23b may be formed by, plating, sputtering or the like, other than the photolithography.

In the embodiment, the top pole tip 23a is formed to be longer than the bottom pole tip 19a from the track surface to the inner direction, so that the top pole tip 23a faces not only the bottom pole tip 19a but also to a part of the outermost peripheral end of the thin film coil 21 through the write gap layer 22.

Then, using the top pole tip 23a as a mask, the write gap layer 22 and the bottom pole tip 19a on the periphery of the top pole tip 23a are etched in a self-aligned manner. That is, a recording track with a trim structure is formed by further etching the bottom pole tip 19a to about 0.3–0.6 μm by ion-milling with Ar after selectively removing the write gap layer 22 by RIE (Reactive Ion Etching) with chlorine gas ($Cl_2$, $CF_4$, $BCl_2$, $SF_6$ and so on), using the top pole tip 23a as a mask.

Then, an insulating layer 20c of about 0.3–0.6 μm in thickness made of, for example, alumina is formed all over the surface by, for example, sputtering or CVD. Then, the insulating layer 20c, the write gap layer 22 and the insulating layer 20b are selectively etched so as to make the surface area of the coil connecting portion 21a of the thin film coil 21 be exposed. Next, a thin film coil 24 of the second layer and a coil connecting portion 24a for an inductive-type recording head made of, for example, copper (Cu) are formed, for example, 1.0–2.0 μm in thickness and 1.2–2.0 μm in coil pitch by, for example, electroplating in the concave region which is formed of the top pole tip 23a and the top connecting portion 23b on the insulating layer 20c. The top and bottom thin film coils 21 and 24, are electrically connected through the coil connecting portions 21a and 24a.

Figure 6:
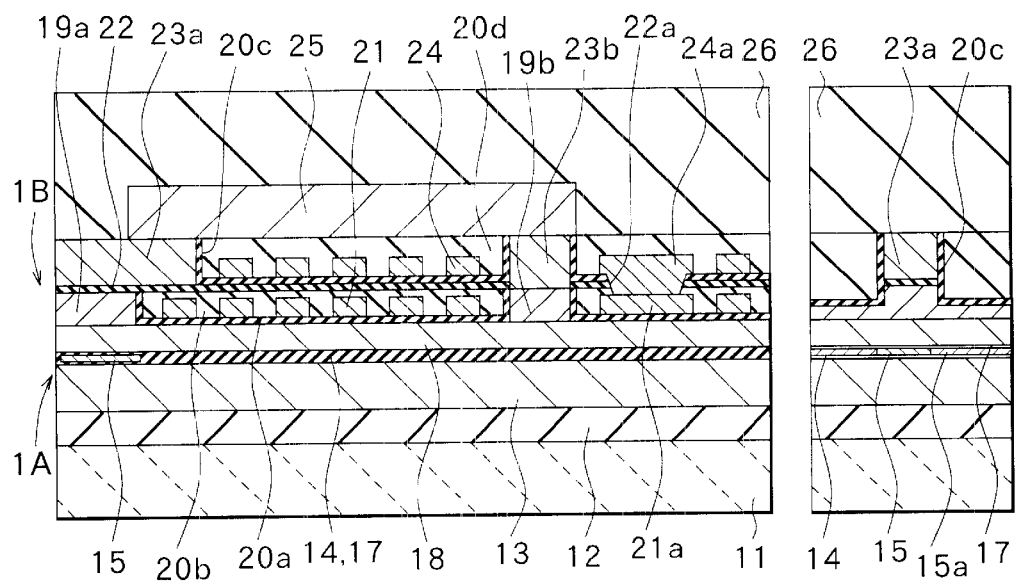
FIG. 6 shows cross sections for describing the following step shown in FIGS. 5A and 5B

Next, as shown in FIG. 6, the insulating layer 20d of about 3–4 μm in thickness, made of such as alumina is formed all over the surface by, for example, sputtering or CVD. The insulating layer 20d and the insulating layer 20c may be formed of other insulating materials such as silicon dioxide (SiO$_2$), silicon nitride (SiN) and so on besides alumina. Then, the insulating layer 20d and the insulating layer 20c are etched so as to make the surfaces of the top pole tip 23a and the top connecting portion 23b be exposed, and are planarized so that the surface of the insulating layers 20c and 20d, and each surface of the top pole tip 23a and the top connecting portion 23b form the same surface.

Next, the top pole layer 25 of about 2–3 μm in thickness is formed using, for example, the same material as top pole tip 23a by, for example, electroplating or sputtering. The top pole layer 25 has a contact with the bottom connecting portion 19b through the top connecting portion 23b in a rearward position of the thin film coils 21 and 24 seeing from the track surface side, and is magnetically coupled to the bottom pole layer 18. At last, an overcoat layer 26 of about 30 μm in film-thickness, made of alumina, is formed on the top pole tip 23a, the top pole layer 25 and the insulating layer 20d by, for example, sputtering. After that, a thin magnetic head is completed by performing a slider machine processing and by forming a track surface (ABS) of a recording head and a reproducing head.

Figure 7:
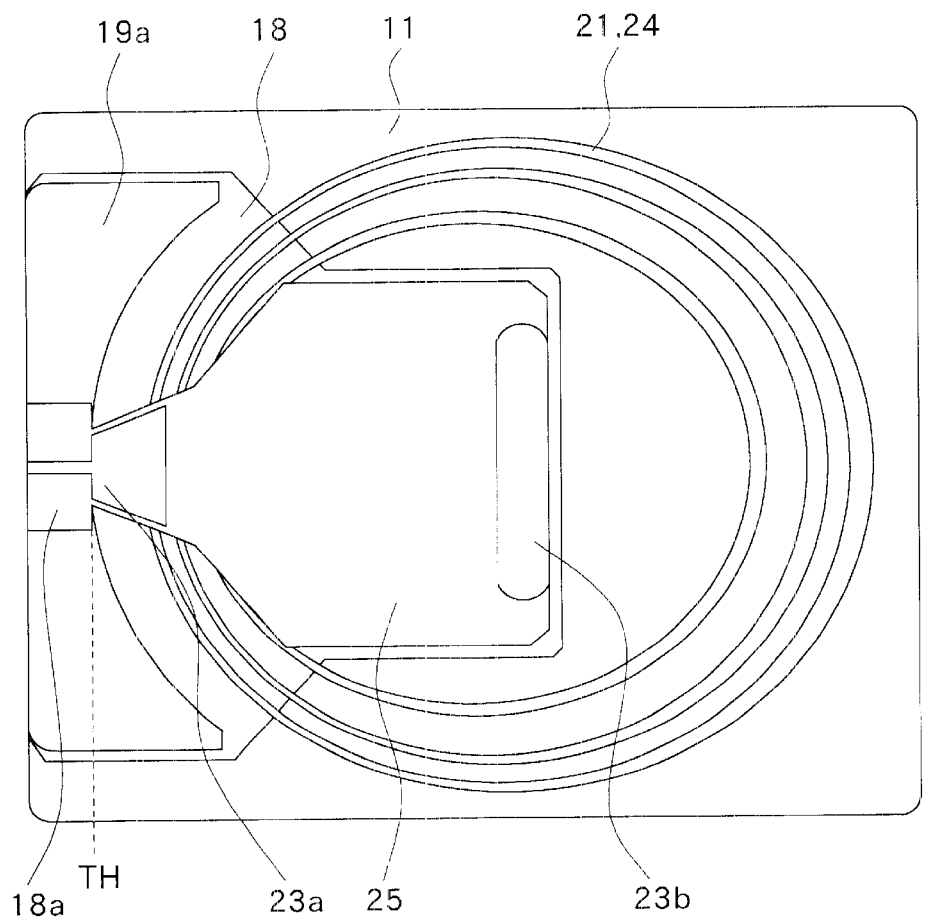
FIG. 7 is a plan view of a thin film magnetic head manufactured according to a first embodiment of the present invention.

FIG. 7 is a plan view of a thin film magnetic head according to the embodiment of the invention. The figure shows a state before the slider machine processing is performed. In the figure, TH represents the throat height, and the throat height TH is determined by the end of the insulating layer 20a of the magnetic pole side, that is, by the end of the bottom pole tip 19a on the opposite side of the track surface. Also, in the figure, the throat height TH coincide with the GMR height, so TH equals to GMR height (TH=GMR height.) Furthermore, in the figure, 18a indicates the trimmed region of the bottom pole layer 18 for the trim structure described above.

With the embodiment described above, effects described in the followings can be obtained.

(1) In the embodiment, the bottom pole is divided into the bottom pole tip 19a and the bottom pole layer 18, and the bottom pole tip 19a is formed on the flat surface of the bottom pole layer 18. As a result, the insulating layers 20a and 20b made of inorganic materials can be buried in the concave region between the bottom pole tip 19a and the bottom connecting portion 19b. Accordingly, the throat height is determined by the end of the insulating layer 20a on the bottom pole tip 19a side (that is, the end of the bottom pole tip 19a on the opposite side of the track surface). Therefore, precise control of the throat height can be achieved because a pattern shift of the end or profile deterioration does not occur, unlike the photoresist film of the related art. Further, precise control of the MR height and apex angle can be achieved.

(2) In the embodiment, the top pole is divided into the top pole tip 23a and the top pole layer 25, and the top pole tip 23a is formed on a flat surface of the bottom pole tip 19a. As a result, the top pole tip 23a for determining the recording track width can be formed to a submicron measurement with high precision. In addition, in the embodiment, the thin film coil 21 of the first layer is buried in the concave region adjacent to the bottom pole tip 19a by the insulating layer 20b, while the surface of the insulating layer 20b is planarized so that its surface forms the same surface as the surface of the bottom pole tip 19a. That is, the difference in height of the apex area including the thin film coil 24 of the second layer is decreased for the height of the thin film coil 21 compared to the configuration of the related art. Accordingly, when forming the top pole layer 25 which has a contact partially with the top pole tip 23a by photolithography, the differences in thickness of the photoresist films in the top and the bottom of the apex area is decreased. As a result, the top pole layer 25 can be minutely formed to the submicron measurement.

Therefore, in the thin film magnetic head obtained through the embodiment, a high surface density recording by a recording head can be achieved, and performance of the recording head can be improved by stacking the coils to two layers or three layers. When applying photolithography to the top pole tip 23a and the top pole layer 25, by using an inorganic insulating layer as a mask instead of the photoresist, the top pole tip 23a and the top pole layer 25 can be minutely formed with higher precision. Further, even in the case where the top pole tip 23a and the top pole layer 25 are formed by such as sputtering other than photolithography, top pole tip 23a and the top pole layer 25 can be minutely formed since influence of the difference in height of the apex area is decreased as well.

Figure 8A:
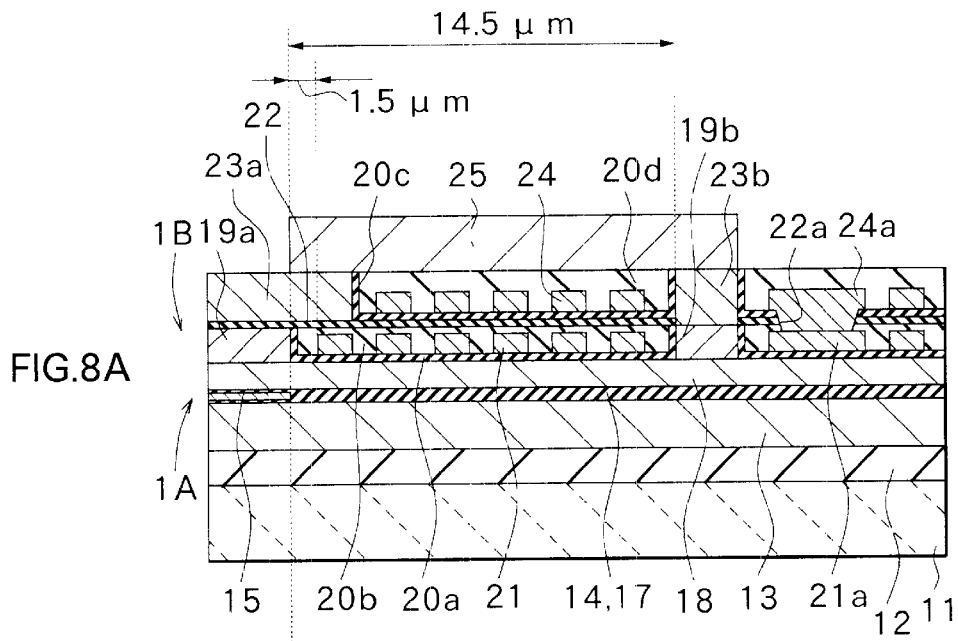
FIGS. 8A and 8B are cross sections for describing a difference in yoke length between the thin film magnetic head according to the first embodiment and a thin film magnetic head of the related art.
Figure 8B:
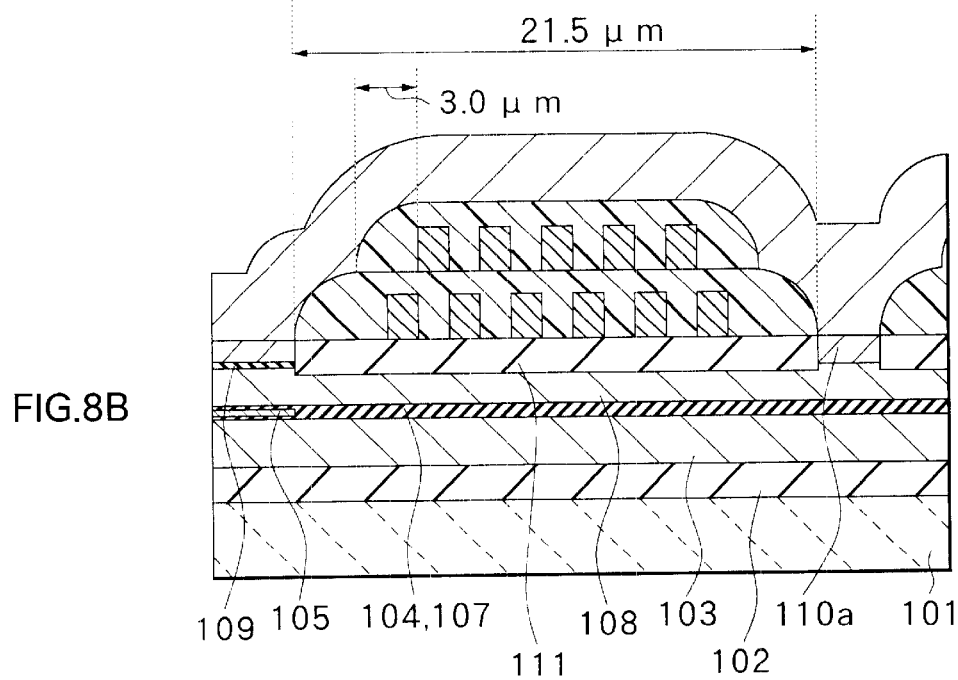

(3) In the embodiment, since there is no slope area of the photoresist pattern, unlike the related art, the thin film coil 21 of the first layer and the thin film coil 24 of the second layer can be formed on the flat area so that the distance between the coil outer peripheral end and the throat height zero position by the slope does not prevent the yoke length from shortening. Accordingly, the yoke length can be made shorter, and the high frequency characteristic of the recording head can be remarkably improved. In the embodiment, it can be designed to be 0.1–0.2 μm which is a locating error of photolithography so that the yoke length can be shortened to equal to or less than 30–40% of that of the related art. If the turns of the thin film coils are the same, the thickness of the coil can be thinner. FIGS. 8A and 8B show the comparison of the yoke length of the thin film magnetic head according to the embodiment described above and that of a thin film magnetic head of the related art. FIG. 8A shows a section vertical to the track surface (ABS) and FIG. 8B shows a section horizontal to the track surface of the pole, respectively.

(4) In the embodiment, the thin film coil 21 may be formed close to the throat height zero position. In addition, since the top pole tip 23a faces the bottom pole tip 19a and a part of the thin film coil 21 through the write gap layer 22, the magnetomotive force from the thin film coil 21 is conducted to the top pole tip 23a efficiently. Therefore, the write_characteristic of a thin film magnetic head is improved.

(5) In the embodiment, as shown in FIG. 7, when each pattern in seen from the right above, the width of the bottom pole tip 19a is made wider than the width of the top pole tip 23a. As a result, even if the top pole tip 23a is a narrow track with half-micron width, the magnetic flux does not saturate in the vicinity of the bottom pole tip 19a.

(6) In the embodiment, the insulating films 20a and 20b made of inorganic materials are formed between the thin film coil 21 and the top shield-cum-bottom pole layer 18, and the write gap film 22 and the insulating layer 20c are formed between the thin film coil 21 and the thin film coil 24. As a result, by adjusting the thickness of each insulating layers, a large insulating resistance can be obtained between each of the thin film coils 21 and 24, and the top shield, respectively so that the insulating characteristic can be maintained and leaking of the magnetic flux from the thin film coils 21 and 24 can be decreased.

(7) In the embodiment, the magnetic layers such as the top pole tip 23a, the top pole layer 25 and so on are formed of high saturation magnetic flux density (Hi-Bs) materials. Even if the track width becomes narrower, the magnetic flux generated in the thin film coils 21 and 24 does not saturate on the way but effectively reaches the top pole tip 23a and the bottom pole tip 19a. Thereby, a recording head without a magnetic loss can be achieved.

(8) Moreover, in the embodiment, the top pole layer 25 formed on the top pole tip 23a for determining the track width is not exposed to the track surface, so that side write by the top pole layer 25 does not occur.

[Second Embodiment]

Figures 9A, 9B:
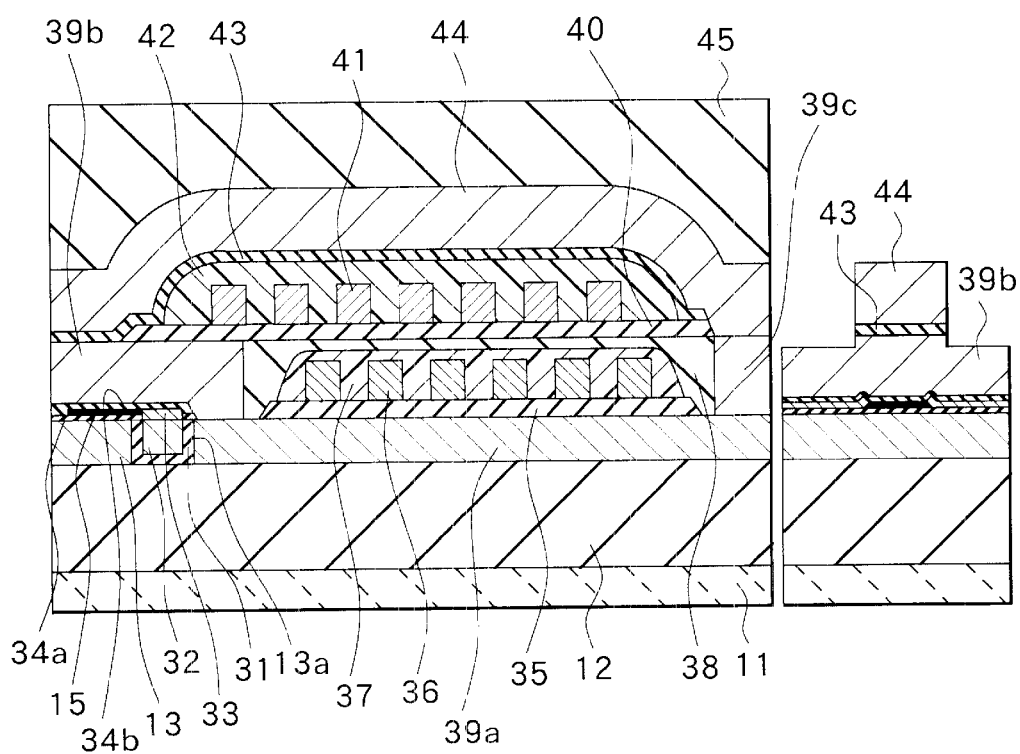
FIGS. 9A and 9B are cross sections for describing a configuration of a thin film magnetic head according to a second embodiment of the invention.
Figures 15A, 15B:
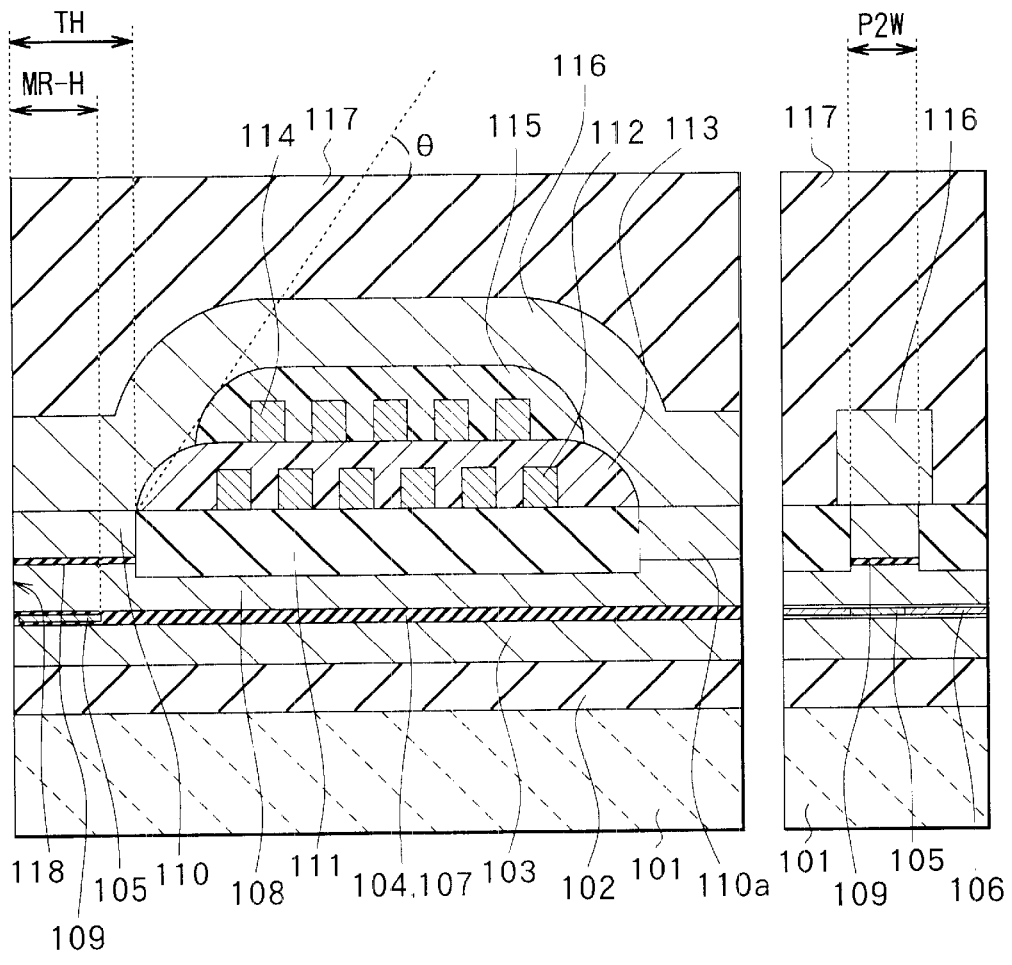
FIGS. 15A and 15B are cross sections for describing the following step shown in FIGS. 14A and 14B.

FIGS. 9A and 9B show the configuration of a magnetic head according to the second embodiment of the invention. The same numerals are given for the same parts of the configuration as those of the first embodiment and the description for them will be omitted. While the first embodiment has a configuration in which a part of the first layer of the thin film coil faces the top pole, a part of the second layer of the thin film coil faces the bottom pole in this embodiment.

In the embodiment, a gap 13a is formed between a bottom shield layer 13 and a first part 39a of the top shield layer, and an insulating layer 31 made of, for example, alumina is formed within the gap 13a by, for example, sputtering. Within the gap 13a covered with the insulating layer 31, a conductive layer 32 made of, for example, a copper (Cu), which is used as an electrode (lead) connected to the MR film 15 is formed by, for example, plating or sputtering.

The surfaces of the bottom shield layer 13, the insulating layer 31 and the conductive layer 32 are planarized by, for example, CMP. On the planarized surfaces, the MR film 15 buried in the shield gap films 34a and 34b, and a electrode layer 33 for electrically connecting the MR film 15 and the conductive layer 32 are formed, respectively. Further, on the first part 39a of the top shield layer, an insulating layer 35 made of alumina or a silicon oxide film is selectively formed, and a thin film coil 36 made of, for example, copper, is formed on the insulating layer 35 by, for example, plating. An insulating layer 37 made of photoresist is formed in a predetermined pattern on the thin film coil 36 and the insulating layer 35.

The insulating layers 35 and 37 are covered with an insulating layer 38 made of alumina. On the shield gap film 34b and the first part 39a of the top shield layer, a second part (-cum-bottom pole) 39b of the top shield layer, which is magnetically coupled to the first part 39a, is formed. Further, a magnetic layer 39c is selectively formed on the first part 39a in a rearward position of the thin film coil 36, and the surfaces of the second part 39b of the top shield layer, the insulating layer 38 and the magnetic layer 39c are planarized by, for example, CMP. On the planarized surfaces of the second part 39b of the top shield layer and the insulating layer 38, an insulating layer 40 made of, for example, alumina for determining the throat height of a recording head is formed. A thin film coil 41 of the second layer is formed on the insulating layer 40, and the thin film coil 41 is covered with an insulating layer 42 made of photoresist. A part closer to the track surface of the thin film coil 41 is located so as to oppose to the second part 39b of the bottom pole-cum-top shield layer through the insulating layer 40.

A write gap layer 43 is formed on the second part 39b of the bottom pole-cum-top shield layer, the insulating layer 40 and the insulating layer 42. A top pole layer 44 for determining the track width of a recording head is formed on the write gap layer 43, and the top pole layer 44 is magnetically coupled to the magnetic layer 39b in a rearward position of the thin film coils 36 and 41. The top pole layer 44 is covered with an overcoat layer 45 made of, for example, alumina.

In the embodiment, the second part 39b of the bottom pole-cum top shield layer corresponds to the first magnetic layer and the first magnetic pole of the invention, and the top pole layer 44 corresponds to the second magnetic layer and the second magnetic pole of the invention, respectively.

In the embodiment, a part of an electrode (the conductive layer 32) connected to the MR film 15 is located in an insulating manner within the gap 13a formed between the bottom shield layer 13 and the first part 39a of the top shield layer so as to extremely enhance insulating performance between the bottom shield layer 13 and the first part 39a of the top shield layer. In addition, in the embodiment, a part closer to the track surface of the thin film coil 41 faces the bottom pole (the second part 39b of the top shield layer) through the insulating layer 40. As a result, as the first embodiment, the magnetomotive force from the thin film coil 41 is conducted to the bottom pole efficiently, and the write characteristic of the thin film magnetic head of this embodiment is improved as well.

Although the invention has been described by referring to the embodiments, the invention also includes other various modifications, not limiting to the embodiments. For example, in the embodiments, examples of forming the top pole tip 23a and the top pole layer 25 and so on of NiFe (Ni: 50% by weight, Fe: 50% by weight), NiFe (Ni: 80% by weight, Fe: 20% by weight), and high saturation magnetic flux density materials such as FeN, FeCoZr and so on are described, however, a configuration of stacking more than two kinds of the materials may be possible.

In the first embodiment, the structure in which the top pole layer 25 is formed in a backward position of the track surface (recessed structure) is described. However, it is possible to have a structure in which the top pole layer 25 is exposed to the track surface along with the top pole tip 23a by making the thickness of the top pole layer 25 relatively thicker than that of the top pole tip 23a. It resolves the problem of side-write caused by the top pole layer 25 even without the recessed structure.

In the embodiment described above, a case where the insulating layer 20b and the insulating layer 20d are formed of alumina, silicon dioxide or silicon nitride is described, however, they may be formed by using an SOG (Spin On Glass) film.

In the embodiment described above, a configuration in which the bottom pole is made to correspond to the first magnetic layer and the top pole is made to correspond to the second magnetic layer, respectively, is shown. However, a configuration in which, each poles corresponds to the other way around may also be possible. That is, a configuration in which the bottom pole corresponds to the second magnetic layer and the top pole corresponds to the first magnetic layer, respectively, may be possible. Further, in the embodiment described above, the thin film magnetic head with a structure in which a recording element is stacked on a reproducing element is described. However, a thin film magnetic head with a structure in which a reproducing element is stacked on a recording element and, further, a thin film magnetic head only for recording with an inductive-type magnetic transducer are also applicable.

As described, according to the thin film magnetic head according to the invention, because a part of the thin film coil is made to face either of two facing poles through the insulating layer, the magnetomotive force from the thin film coil is conducted to the facing pole efficiently, and the write characteristic is improved.

According to the other thin film magnetic head, or a method of manufacturing a thin film magnetic head of the invention, the first magnetic pole is formed to be protruded shape on the first magnetic layer and a thin film coil is formed in a concave region adjacent to the first magnetic pole, so that the insulating layer made of an inorganic material can be buried in the concave region adjacent to the first magnetic pole. Therefore, the throat height is determined by the end of the first magnetic pole on the opposite side of the track surface, so that a pattern shift of the end or deterioration of profile does not occur, unlike the photoresist film of the related art and precise control of the throat height can be achieved.

Further, by burying the thin film coil in the concave region adjacent to the first magnetic pole, the difference in height of the apex area can be decreased compared to the structure of the related art. In the manufacturing step thereafter, when forming the second magnetic layer by photolithography, the difference in the thickness of the photoresist film in the top and the bottom of the apex area can be decreased. As a result, the second magnetic layer can be minutely formed to the submicron measurement. Therefore, the high surface density recording by a recording head becomes possible, and the performance of the recording head can be improved by stacking the coil to two or three layers.

In addition, it is not necessary to form the thin film coil away from the throat height zero position. That is, the thin film coil can be formed in the vicinity of the throat height zero position of the end of the first magnetic pole. Furthermore, since the second magnetic pole is made to face a part of the thin film coil sandwiching the write gap layer, the magnetomotive force from the thin film coil is conducted to the second magnetic pole efficiently, and t he write characteristic is improved.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin film magnetic head having at least two magnetic layers including a first magnetic pole and a second magnetic pole being magnetically coupled to each other, part of sides of which facing a recording medium face each other sandwiching a write gap layer, and one or more than two layers of thin film coil for generating magnetic flux, including the steps of:

forming a first magnetic pole on the first magnetic layer so as to be magnetically coupled to part of a region of the first magnetic layer after forming the first magnetic layer;

forming insulating layers of inorganic materials extendedly, at least from a surface of the first magnetic pole which is the opposite side of a surface facing the recording medium to one of the surfaces of the first magnetic layer;

forming a thin film coil within a concave region in which the insulating layers are formed;

forming the second magnetic pole to be longer than the first magnetic pole so as to face at least a part of thin film coil to the inner direction from a surface facing the recording medium at least sequentially after forming a write gap layer on the first magnetic pole; and forming the second magnetic layer in direct contact with the second magnetic pole.

2. A method of manufacturing a thin film magnetic head according to claim 1, wherein the length from a surface of the first magnetic pole facing the recording medium equals to the throat height of a recording head.

3. A method of manufacturing a thin film magnetic head according claim 1, including the steps of: forming a first insulating layer extendedly from a surface of the first magnetic pole which is opposite to a surface facing the recording medium to one surface of the first magnetic layer; and forming a second insulating layer at least in between the turns of the thin film coils.

4. A method of manufacturing a thin film magnetic head according to claim 3, including a step of planarization of the surface of the second insulating layer which is opposite to an adjacent surface of the first magnetic layer so as to be substantially the same surface as a surface of the first magnetic pole which is opposite to an adjacent surface of the write gap layer.

5. A method of manufacturing a thin film magnetic head according to claim 1, wherein the width along the surface facing the recording medium of the first magnetic pole is formed to be wider than the width of the second magnetic pole.

6. A method of manufacturing a thin film magnetic head according to claims 1, wherein the end of the surface of the second magnetic layer facing the recording medium is formed in a rearward position of the surface facing the recording medium.

7. A method of manufacturing a thin film magnetic head having at least two magnetic layers including a first magnetic pole and a second magnetic pole being magnetically coupled to each other, part of sides of which facing a recording medium face each other sandwiching a write gap layer, and one or more than two layers of thin film coil for generating magnetic flux, including the steps of:

forming a first magnetic pole on the first magnetic layer so as to be magnetically coupled to part of a region of the first magnetic layer after forming the first magnetic layer;

forming insulating layers of inorganic materials extendedly, at least from a surface of the first magnetic pole which is the opposite side of a surface facing the recording medium to one of the surfaces of the first magnetic layer;

forming a thin film coil within a concave region in which the insulating layers are formed;

forming the second magnetic pole to be longer than the first magnetic pole so as to face at least a part of the thin film coil to the inner direction from a surface facing the recording medium at least after forming a write gap layer on the first magnetic pole;

forming the second magnetic layer by magnetically coupling to the second magnetic pole, wherein the end of the surface of the second magnetic layer facing the recording medium is formed in a rearward position of the surface facing the recording medium; and a third insulating layer is, at least, formed extendedly from a surface of the second magnetic pole which is the opposite side of a surface facing the recording medium to a surface of the write gap layer which is the opposite side of an adjacent surface of the second magnetic pole.

8. A method of manufacturing a thin film magnetic head according to claim 7, wherein another thin film coil which is different from the thin film coil is located within a region where the third insulating layer is formed, and the another thin film coil is covered with another insulating layer which is different from the first to the third insulating layers and is placed between the third insulating layer and the second magnetic layer.

9. A method of manufacturing a thin film magnetic head according to claim 8, wherein surfaces of the third insulating layer and the another insulating layer are planarized to be substantially the same surface as a surface of the second magnetic pole which is the opposite side of a adjacent surface of the write gap layer.

* * * * *